United States Patent [19]

Bläss et al.

[11] 3,985,955

[45] Oct. 12, 1976

[54] APPARATUS FOR MEASURING THE DISTORTION OF DATA SIGNALS

[75] Inventors: Gerhard Bläss, Munich; Johann Disl, Bad Tolz, both of Germany

[73] Assignee: Siemens Aktiengesellschaft, Munich, Germany

[22] Filed: Nov. 22, 1974

[21] Appl. No.: 526,214

[30] Foreign Application Priority Data

Nov. 22, 1973 Germany............................ 2358296

[52] U.S. Cl................................. 178/69 A; 328/162
[51] Int. Cl.²........................................ H04L 25/06
[58] Field of Search............ 178/69 A, 69 R, 23 A; 328/162, 163, 164; 324/83 D

[56] References Cited
UNITED STATES PATENTS 3,182,127    5/1965    Wiese .............................. 178/69 A

OTHER PUBLICATIONS

Oeters et al., "Distortion Indicator", IBM Tech. Discl. Bulletin, vol. 6, No. 4, Sept. 1963, pp. 48 and 49.

*Primary Examiner*—Thomas A. Robinson
*Attorney, Agent, or Firm*—Gerald L. Lett

[57] ABSTRACT

Apparatus is described for measuring distortion appearing on data signals. This apparatus is of the type which uses a counter that, responsive to a pulse train of constant repetition frequency, counts from an initial to a final value during each segment of the data signal. Those counted values which occur simultaneously to pulse edges are stored. A decoder decodes the stored counts, and the decoded result is caused to appear on a display device. The counts are intermediately stored until passed by a blocking device which opens responsive to the appearance of an interrogation pulse generated in the middle of each data element. The stored counts are coupled, upon being passed by the blocking device, to the decoder and/or a display device.

8 Claims, 3 Drawing Figures

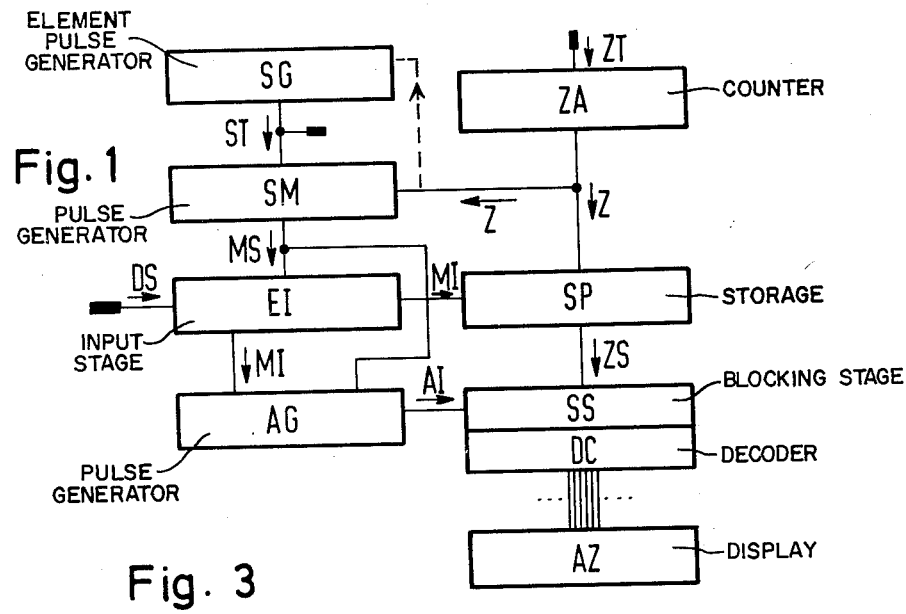
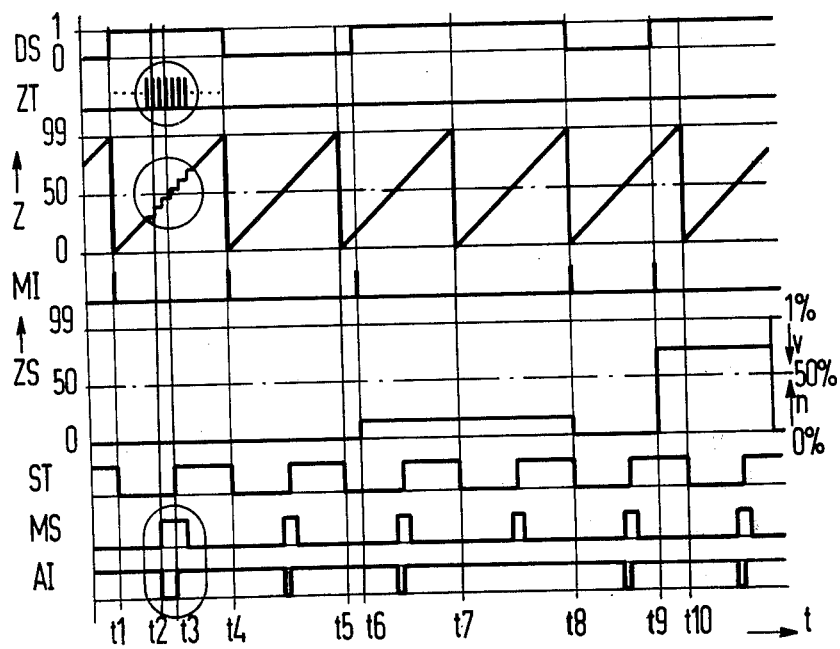

APPARATUS FOR MEASURING THE DISTORTION OF DATA SIGNALS

BACKGROUND OF THE INVENTION

This invention relates to apparatus for measuring the distortion of data signals by means of a counter which, during each element of the data signal, is caused by a counter pulse train to count from an initial value to a final value. A store also used for display purposes stores the counts which occur simultaneously to the edges of the data signals and measuring pulses which are thereby produced. A decoder decodes the stored counts, and a display device displays the decoded counts.

Various apparatus for the measurement of the distortion of data signals are already known which display the distortion on cathode ray tubes. Apparatus of this type are usually employed at data element rates of up to approximately 10kBd. A known circuit arrangement contains a counter which, for the duration of the element, is caused to count from a constant initial value up to a constant final value. When the data signal which is to be measured changes its binary value, the instantaneous count is recorded, for display, into a store. The stored count causes a deflection of the electron beam in the cathode ray tube and the distortion of the data signal can be read off on the screen. Apparatus of this type is not suitable for measuring the distortion at element rates of above 10 kBd, as the individual measured values cannot be seen on the screen of known cathode ray tubes at these element rates.

Furthermore, apparatus is known for measuring the distortion of data signals which can also be used at element rates of up to 100 kBd. This apparatus also contains a counter which, during the length of an element, counts up once from a constant initial value to a constant final value. The outputs of the counter are connected to the inputs of a decoder which is provided with a number of outputs corresponding to the possible counts of the counter. At each output of the decoder is connected a store which is assigned a display store and a luminescence diode. When the data signal which is to be measured changes its binary value, a store is in each case switched from its rest position to its operative position and the associated luminescence diode is triggered via the display store. With this known device it is also impossible to accurately measure the distortion at element rates of above 100 kBd, as there is not sufficient time to decode and store the count. The given limit of the element speed is here determined not by the display, but by the acquisition of the measured value.

An object of the invention is, therefore, to provide apparatus for measuring the distortion of data signals which operates with a high degree of accuracy, even at element rates of above 100 kBd.

SUMMARY OF THE INVENTION

In accordance with the invention this and other objects are realized in the apparatus of the type described hereinabove by using a store in which the counts are intermediately stored for further processing, a first pulse generator which produces an interrogation pulse in the center of the data elements, and a first blocking stage which is supplied with the interrogation pulses and during the length of the interrogation pulses switches through the stored counts to a decoder and/or to a display device.

Apparatus constructed in accordance with the invention has the advantage that it can be constructed exclusively from digitally operating circuits. Thus, it is substantially independent of environmental conditions and fluctuations in voltage. Its construction costs are favorable because the counts which are to be decoded are intermediately stored in a store, and thus, the decoding may be carried out in a relatively low speed and reasonably priced decoder. The repetition frequency of the counter pulse train can be selected to be very high because, until the acquisition of the measured value, merely the transit times of a few series connected circuits in a limited part of the circuit arrangement are added. Consequently, even at element rates of above 100 kBd the distortion of the data signals is measured with a high degree of accuracy.

In order to ensure that the stored counts are not altered during decoding, it is advantageous to provide a second pulse generator which is connected to the output of the counter. In the middle of the elements, this second pulse generator produces a middle signal whose duration is greater than the pulse duration of the interrogation pulses. A second blocking stage is provided which blocks the measuring pulses when the middle signals occur simultaneously.

The middle signal is produced in simple fashion by a first flip-flop which is set shortly before the middle of each element and is reset shortly after the middle of each element by the signals emitted at the output of the counter. This flip-flop emits the middle signal at its output.

The production of the interrogation pulses is made inexpensive by using a second flip-flop which is set with each measuring pulse and is reset by a signal emitted by the counter and the middle signal in the middle of each element. A first NAND gate is provided which is supplied with the output signal of the second flip-flop and with the middle signal and which emits the interrogation pulse at its output.

If an element pulse train is required for further processing of the data signals it is advantageous to provide an element pulse train generator to which the signals emitted at the output of the counter are conducted and which produces an element pulse train which changes its binary value in the middle of and at the boundaries of each element.

In order to be able to control the first flip-flop with a low delay time via its triggering inputs, it is advantageous to provide a third flip-flop, which is connected ahead of the first flip-flop. A second and a third NAND gate are provided which are supplied with the element pulse train and with the signals emitted by the counter, and the outputs of these gates are connected to the setting and resetting inputs of the third flip-flop.

The element pulse train is produced using a counter with a high degree of accuracy by using in addition in the element pulse generator a fourth flip-flop which is set when the counter has reached half its final value and which is reset when the counter is reset from its final value to its initial value and which emits the element pulse train at its output.

The element pulse generator is substantially like the first pulse generator and is of low cost if the fourth flip-flop is preceded by a fifth flip-flop and if a fourth and fifth NAND gate are provided which are supplied with the signals emitted by the counter and whose outputs are connected to the setting and resetting inputs of the fifth flip-flop.

A special first blocking circuit is not required if the decoder can be switched over.

In order to produce measuring pulses having a fixed correlation to the counter pulse train, it is advantageous to provide two further flip-flops which are successively set or reset by the counter pulse train when the data signal changes its binary value. An AND-OR gate is provided which produces the measuring pulses when the other flip-flops assume different binary values.

If the distortion of the data signals is to be displayed only when the data signal changes its binary value either from 1 to 0 or from 0 to 1, it is advantageous to provide, in the AND-OR gate, a first and second input via which the production of measuring pulses is blocked by a first and second signal, respectively, when the data signal changes its binary value from 0 to 1 and from 1 to 0, respectively.

BRIEF DESCRIPTION OF THE DRAWINGS

A preferred exemplary embodiment of apparatus for the measurement of the distortion of data signals will be explained in the following making reference to drawings which are briefly described below.

FIG. 1 is a block circuit diagram of the inventive apparatus.

FIG. 3 is waveform diagrams of signals at various points of the FIG. 1 embodiment.

DETAILED DESCRIPTION OF THE DRAWINGS

Figure 2:
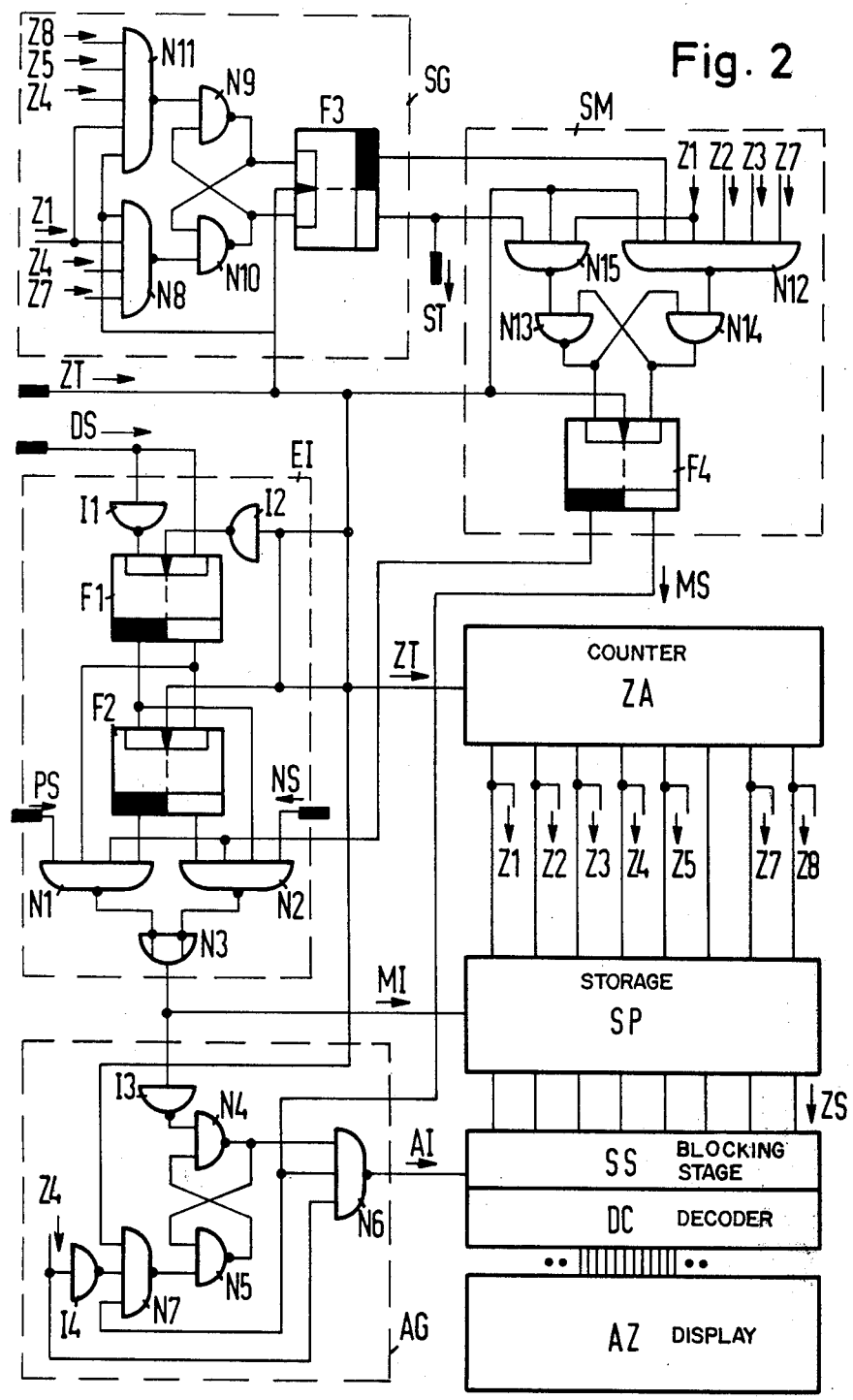
FIG. 2 is a more detailed schematic diagram of the FIG. 1 embodiment.

The block circuit diagram shown in FIG. 1 shows a counter ZA which is operated by a counter pulse train ZT and which constantly counts from a constant initial value to a constant final value. The counter pulse train ZT is produced in known manner in a non-illustrated generator, for example by means of a quartz oscillator, and its repetition frequency is selected to be such that during an element of an undistorted data signal DS the counter ZA counts up from its initial value to its final value. In the described exemplary embodiment, the counter ZA is controlled in such manner that with each edge of the undistorted data signal it automatically passes from its final value to its initial value.

If the data signals DS are distorted, their edges arrive prior to or following the final value of the counter ZA, and the count Z of the counter ZA on the arrival of an edge is a measure of the distortion. The repetition frequency of the counter pulse train ZT and the difference between the initial value and the final value of the counter ZA determine the measuring accuracy. For example, a measuring accuracy of 1% is achieved, if the repetition frequency of the counter pulse train ZT is selected to be such that 100 pulses of the counter pulse train ZT arrive between two edges of an undistorted data signal DS. In this example it is desirable for the counter ZA to in each case count from its initial value 0 to the final value 99.

The data signals DS, which are to be measured, are present at the input of an input stage EI which produces short measuring pulses MI at the times of the edges of the data signals DS. These measuring pulses MI are conducted to a store SP which intermediately stores the instantaneous count Z of the counter ZA. Each stored count ZS is then conducted via a blocking stage SS to a decoder DC. In the middle of the following element, an interrogation pulse AI switches the stored count via the blocking stage SS to the decoder DC and a display device AZ displays the stored count ZS.

The interrogation pulse AI is obtained in a pulse generator AG from a middle signal MS produced in another pulse generator SM. The middle signal MS indicates the middle of an element and has a duration, for example, of 6% of the element duration. It is also conducted to input stage EI where, via a further blocking stage, it prevents the production of a measuring pulse MI during the occurrence of the middle signal MS. In this way the stored count ZS is prevented from changing during decoding.

FIG. 1 also shows an element pulse generator SG which is supplied with the counts Z, and at its output, emits an element pulse train ST which alters its binary value at the boundaries of and in the middle of the elements.

FIG. 2 is a more detailed circuit diagram of the FIG. 1 embodiment wherein like elements have like reference letters or numerals. The counter ZA is constructed, for example, from two modulo-10-counters, and during each element of an undistorted data signal DS it counts up exactly once from the initial value 0 to the final value 99. The data signal DS is present at the input of the input stage EI which comprises two flip-flops F1 and F2, three NAND gates N1 to N3 and two inverters 11 and 12. In the exemplary embodiment the store SP of conventional construction is to store the counts Z between 0 and 99 and comprises in the known manner eight flip-flops whose data inputs are connected to the outputs of the counter ZA and whose pulse train inputs are supplied with the measuring pulses MI.

The pulse generator AG contains four NAND gates N4 to N7 and two inverters 13 and 14. The decoder DC, which is of known construction, has a number of outputs corresponding to the number of counts Z which the counter ZA can assume. It is preceded by the blocking stage SS, also of known construction, which prevents the decoding of the stored counts ZS when no interrogation pulse AI is present. This stage comprises, for example, eight AND gates which are supplied with the signals at the output of the store SP and with the interrogation pulses AI. The decoder DC converts the counts ZS, which have been stored in the form of decimal-coded binary numbers, in such manner that in each case only one output of the decoder DC assumes a first binary value, whereas all the other outputs assume the second binary value. The outputs of the decoder DC are connected to the inputs of the display device AZ which displays the decoded, stored count ZS. The element pulse generator SG is constructed from a flip-flop F3 and four NAND gates N8 to N11. The pulse generator SM which produces the middle signal MS is substantially similar to the element pulse generator SG and contains a flip-flop F4 and four NAND gates N12 to N15.

Further operating details of the circuit arrangement shown in FIG. 2 will be given in the following in association with the time-waveform diagrams illustrated in FIG. 3.

In the diagrams shown in FIG. 3 of signals at various points of the circuit arrangement, the time $t$ is plotted in the abscissa direction and the amplitudes of the signals are represented in the ordinate direction. With the exception of the count Z and the store contents ZS, all the signals are binary signals which assume binary values referenced 0 and 1. The count Z and the stored count ZS have been represented as analog signals in order to improve the clarity of the illustration.

FIG. 3 shows several elements of the data signals DS. The theoretical element boundaries are the times t1, t4, t5, t7, t8 and t10. It is assumed that the data signals DS are not distorted at the times t1, t4 and t8. It is further assumed that at the time t6 there is a lagging distortion and at the time t9 a leading distortion and that at these times the edges of the data signals are not identical to the theoretical element boundaries. It is further assumed that the binary value of the data signals DS does not alter between the times t6 and t8.

The counter pulse train ZT is conducted to the counter ZA, to the input stage EI, to the element pulse generator SG and to the pulse generators AG and SM. The counter pulse train ZT causes the counter ZA in the exemplary embodiment to count between two element boundaries, thus one theoretical element duration or once from the initial value 0 to the final value 99. At each theoretical element boundary, the counter ZA automatically passes from its final value 99 to its initial value 0. In the selected representation of the counts Z is FIG. 3, there is thus formed a staircase curve whose period is equal to the theoretical element duration. During the first element, FIG. 3 shows a portion of the staircase curve and a part of the counter pulse trains ZT and in each case one middle signal MS and one interrogation pulse AI on an enlarged scale.

At the time t1, the data signal DS changes its binary value from 0 to 1. As no distortion exists at this time, the counter ZA simultaneously passes from its final value 99 to its initial value 0.

The data signal DS and the data signal which has been inverted by means of the inverter 11 set the flip-flop F1 with the next pulse of the counter pulse train ZT, which pulse has been inverted by the inverter 12. As the flip-flop F2 assumes the binary value of the flip-flop F1 in each case delayed by one half period of the counter pulse train ZT, the input stage EI feeds a measuring pulse MI via the NAND gates N1 and N3 to the store SP. The measuring pulse MI inputs the instantaneous count Z=0 into the store SP. At the same time, via the inverter 13 it sets a flip-flop constructed of the NAND gates N4 and N5 and prepares the NAND gate N6 for the emission of an interrogation pulse AI. With a delay of one half period of the counter pulse train ZT the flip-flop F2 is set and the measuring pulse MI is ended.

The count ZS which has been input by the measuring pulse MI into the store SP and which is also represented as an analog signal, has the value 0 which, as shown by the scale on the right hand side of FIG. 3, is assigned to a distortion of 0%. The letters n and v in the scale in FIG. 3 indicate that this is a lagging or leading distortion, respectively.

When the counter ZA has reached the count Z=47, the signals Z1, Z2, Z3 and Z7 at its output thus assume the binary value 1. Assuming that the flip-flop F3 is reset, with the next pulse of the counter pulse train ZT the NAND gate N12 sets a flip-flop composed of the NAND gates N13 and N14. With the trailing edge of this pulse the counter ZA assumes the count Z=48, and the flip-flop F4 is set. At the time t2, at the output of this flip-flop F4, there is emitted the middle signal MS which indicates the period of time of an element in which the stored count ZS can be processed.

With the count Z=18, the signal Z4 at the output of the counter ZA assumes the binary value 1 and, via the NAND gate N6, the pulse generator AG produces an interrogation pulse AI which releases the blocking stage SS, switches through the stored count SS=0 to the decoder DC and conducts it to the display device AZ. The display device AZ displays a distortion of 0% which is assigned to the stored count ZS. At the same time, via the blocking stage formed from the NAND gates N1 and N2 in the input stage EI, the middle signal MS prevents the stored count ZS from being altered during the display transfer.

Naturally, the blocking stage SS can also be arranged between the decoder DC and the display device AZ, or it is possible to dispense with a blocking stage SS if a switchable decoder is available.

At the time t3, the counter ZA reaches the count Z=50. The signal Z4 assumes the binary value 0, ends the interrogation pulse AI, and with the next pulse of the counter pulse train ZT resets the flip-flop which consists of the NAND gates N4 and N5.

Immediately beforehand, with the count Z=49, a flip-flop composed of the NAND gates N9 and N10 has been set via the NAND gate N8 and with the count Z=50 the flip-flop F3 is set. The element pulse train ST is emitted at the output of the flip-flop F3 and assumes the binary value 1. The element pluse train ST is conducted to the NAND gate N15, and the inverted element pulse train is conducted to the NAND gate N12. Also, the element pulse train ST for the synchronization of the data signals is emitted at an output of the circuit arrangement.

With the count Z=51, the signal Z1 assumes the binary value 1, and with the next pulse of the counter pulse train ZT, via the NAND gate N15 the flip-flop comprising the NAND gates N13 and N14 is reset again. Then the flip-flop F4 is also reset, and thus, with the count Z=52, the middle signal MS reassumes the binary value 0. It releases the NAND gates N1 and N2 of the blocking stage in the input stage EI and, in addition to the signal Z4, also blocks the NAND gate N6 to prevent an interrogation pulse AI from being produced outside the middle of the element.

When the final value 99 is reached, the flip-flop composed of the NAND gates N9 and N10 is reset via the NAND gate N11. With the following pulse of the counter pulse train ZT, at the time t4, the flip-flop F3 is also reset. The element pulse train ST thus again assumes the binary value 0. At the same time, the counter ZA passes from its final value to its initial value. Also, the data signal DS changes its binary value from 1 to 0.

Following the change of the data signal DS, the flip-flop F1 is reset again, and via the NAND gate N3, the NAND gate N2 produces a new measuring pulse MI. This measuring pulse MI re-inputs the count 0 into the store SP, which thus again indicates that the data signal DS is not distorted. In the middle of the following element a middle signal MS, an interrogation pulse AI and an element pulse train ST are again produced.

At the time t5, the counter again reaches its final value and it reassumes its initial value. As at this time, a lagging distortion of the data signal DS occurs, it does not change its binary value from 0 to 1 until the time t6. Thus, the input stage EI also does not produce a measuring pulse MI until the time t6. This measuring pulse MI inputs the instantaneous count A, e.g., 12 into the store SP. The stored count ZS = 12 is assigned to a lagging distortion of the data signal of 12%. in the middle of the following element a middle signal MS, an interrogation pulse AI and an element pulse train ST are produced again. The interrogation pulse AI again switches the stored count ZS via the blocking stage SS to the decoder DC and the display device AZ indicates a lagging distortion of 12%.

At the time t7, the data signal DS does not change its binary value. Thus, the input stage EI also does not produce a measuring pulse, and the flip-flop composed of the NAND gates N4 and N5 is not set. Consequently, the NAND gate MS is blocked and no interrogation pulse AI is emitted at its output. In this way a distortion is prevented from being displayed when the data signal DS has not changed.

At the time t8, no distortion of the data signal DS occurs. Therefore, a distortion of 0% is displayed in the display device AZ as in the case of the elements following the times t1 and t4.

At the time t9, the data signal DS again changes its binary value from 0 to 1. As it is now assumed that at this time a leading distortion occurs, the counter ZA has not yet reached its final value and the measuring pulse MI inputs the count e.g., of Z=75 into the store SP. At the time t10, the counter ZA again reaches its final value and reassumes its initial value. In the middle of the next element the interrogation pulse AI transfers the stored count ZS via the blocking stage SS into the decoder DC and into the display device AZ, where a leading distortion of 25% is now displayed.

If the distortion is only to be displayed when the data signal alters its binary value either from 1 to 0 of from 0 to 1, in the input stage EI, a signal PS and a signal NS control the emission of the measuring pulses MI via the AND-OR gate composed of the NAND gates N1 to N3.

The signal PS is conducted to the NAND gate N1, and when it assumes the binary value 0, the NAND gate N1 is blocked. Thus, the signal PS can be used to prevent measuring pulses MI from being emitted when the data signal DS changes its binary value from 0 to 1. In the same way the signal NS, which is conducted to the NAND gate N2, prevents the emission of measuring pulses MI when the data signal DS changes its binary value from 1 to 0.

The invention has been described by describing a preferred embodiment constructed according to its principles, and the described embodiment is to be considered only as being exemplary. It is contemplated that the described embodiment can be changed or modified in a variety of ways while remaining within the scope of the invention as defined by the appended claims.

We claim:

1. Apparatus for measuring the distortion of data signals, comprising:
    counter means for counting a pulse train of constant repetion frequency, said counter means counting from a predetermined initial value to a predetermined final value during an element of said data signal,
    storage means for storing those of said counts which occur simultaneously with edges of pulses forming said data signal,
    first pulse generator means for producing an interrogation pulse in the middle of elements of said data signal,
    decoding means for receiving and converting the contents of said storage means to predetermined values corresponding to the stored values,
    blocking means operable in response to the appearance of a said interrogation pulse for coupling the contents of said storage means to said decoding means and
    display means for visually displaying the output of said decoding means.

2. The apparatus defined in claim 1 further comprising:
    second pulse generator means for producing a middle signal having a duration longer than the duration of said interrogation pulses,
    input means for receiving said data signals and for producing measuring signals simultaneously with edges of said data signals, said measuring signals being coupled to said storage means to cause storage of said counts occurring simultaneously therewith.
    second blocking means operable in response to said middle signal to prevent passage of said measuring signals to said storage means.

3. The apparatus defined in claim 2 further comprising:
    first bistable switching means operable responsive to said counter means for coupling said middle signal to said second blocking means during an interval beginning shortly before and ending shortly after the middle of each element of said data signal.

4. The apparatus defined in claim 3 further comprising:
    second bistable switching means operable responsive to said measuring pulse and an output from said counter means, and
    first NAND gate means operable responsive to the output from said second bistable switching means for switching through said interrogation pulses.

5. The apparatus defined in claim 4 further comprising:
    element pulse generator means actuated by outputs from said counter means for producing an element pulse train which changes its binary value in the middle and at the boundaries of each element of said data signal, and
    third bistable switching means interposed in the signal path between said counter means and said first bistable switching means and operable responsive to said element pulse train for permitting passage of signals therebetween.

6. The apparatus defined in claim 5 further comprising:
    fourth bistable switching means which is set when said counter means reaches half said final value and reset when said counter means is reset from its final value for emitting said element pulse train from said element pulse generator.

7. The apparatus defined in claim 6 further comprising:
    fifth and sixth bistable switching means which are successively set and reset by the counter pulse train when said data signal changes its binary value and logic gating means interposed between said input means and said storage means and operable when said fifth and sixth bistable switching stages assume different states to pass said measuring signals to said storage means.

8. The apparatus defined in claim 7 further comprising:
    means for blocking said measuring signal when said data signal changes its binary value.

* * * * *